(12) United States Patent
Han

(10) Patent No.: US 8,786,797 B2
(45) Date of Patent: Jul. 22, 2014

(54) BACKLIGHT LAMP COVER, BACKLIGHT BACKBOARD AND LIQUID CRYSTAL DISPLAY MODULE

(75) Inventor: Rui Han, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 17 days.

(21) Appl. No.: 13/351,517

(22) Filed: Jan. 17, 2012

(65) Prior Publication Data

US 2012/0188479 A1 Jul. 26, 2012

(30) Foreign Application Priority Data

Jan. 25, 2011 (CN) ...................... 2011 2 0023860 A

(51) Int. Cl.
*G02F 1/1333* (2006.01)
(52) U.S. Cl.
USPC .............. 349/58; 362/632; 362/633; 362/634
(58) Field of Classification Search
CPC ..................... G02F 1/133308; G02F 1/133608; G02F 1/133604
See application file for complete search history.

(56) References Cited

U.S. PATENT DOCUMENTS

| | | | |
|---|---|---|---|
| 2002/0196384 A1* | 12/2002 | Sakamoto et al. | 349/58 |
| 2006/0187679 A1* | 8/2006 | Cha et al. | 362/633 |
| 2008/0170170 A1* | 7/2008 | Jung et al. | 349/58 |
| 2011/0051033 A1* | 3/2011 | Shimizu | 349/58 |
| 2011/0134346 A1* | 6/2011 | Hayashi et al. | 349/58 |

* cited by examiner

*Primary Examiner* — Bumsuk Won
*Assistant Examiner* — Ryan Crockett
(74) *Attorney, Agent, or Firm* — Ladas & Parry LLP

(57) ABSTRACT

The present disclosure provides a backlight lamp cover, a backlight backboard and a liquid crystal display module. According to the present disclosure, a lamp cover is improved by further providing a bending structure to support and limit a movement of a liquid crystal display panel as well as to support a bezel, in substitution of main functions of a mold frame in the related art. At the same time, the backboard structure is improved accordingly by adding a stepped structure so as to supplementally limit the liquid crystal display panel. Thus, the functions of a mold frame in the related art can be provided without a conventional mold frame in a liquid crystal display module. That is, one part is reduced.

14 Claims, 4 Drawing Sheets

BACKLIGHT LAMP COVER, BACKLIGHT BACKBOARD AND LIQUID CRYSTAL DISPLAY MODULE

FIELD OF THE INVENTION

Embodiments of the present disclosure relate to a display apparatus, and in particular to a backlight lamp cover, a backlight backboard and a liquid crystal display module.

BACKGROUND OF THE INVENTION

A Thin Film Transistor Liquid Crystal Display (TFT-LCD) has advantages such as small volume, low power consumption, no radiation, etc., and occupies the leading position of the flat panel display market, being widely used in various fields such as liquid crystal televisions, computers, cell phones, PDA, and so on. In a liquid crystal display, a backlight is an important component, for providing a light source for a liquid crystal display in work, and the backlight constitutes a large proportion of a cost of the entire liquid crystal display. Therefore, reduction in the cost of the backlight becomes one of the aims in continuous competitions of every manufacturing factory.

As shown in FIG. 1, a typical liquid crystal display module comprises a backlight module and a liquid crystal display panel 1. In order to secure the liquid crystal display panel 1, it is required to provide a backboard of the backlight module with a mold frame 2, dispose the liquid crystal display panel 1 on the mold frame 2, and secure said liquid crystal display panel 1 and the backlight module together by using a bezel 5 shown in FIG. 1. As can be seen from FIG. 1, the mold frame 2 mainly functions to support the liquid crystal display panel 1 and limit a movement of the liquid crystal display panel 1. F1 in FIG. 1 illustrates the supporting force for supporting the liquid crystal display panel, and F2 illustrates the acting force for limiting the movement of the liquid crystal display panel 1. Also, the mold frame 2 needs to function as a support for the bezel 5, and F3 illustrates the supporting force for supporting the bezel 5.

A structure of a lamp cover 3 in an existing backlight module is shown in FIG. 1 and FIG. 2. The lamp cover 3 in FIG. 1 and FIG. 2 mainly functions to protect a lamp tube and dissipate heat from the lamp tube.

The inventor finds that the related art has at least the following problems: in an existing backlight, the mold frame is designed separately, and therefore, the development cost for dies is comparatively high; and meanwhile, the backlight has a relatively large number of parts, causing a comparatively low efficiency of assembling the backlight.

SUMMARY OF THE INVENTION

The present disclosure aims to provide a backlight lamp cover, a backlight backboard and a liquid crystal display module, making it possible to cancel a mold frame in a liquid crystal display module of the related art, that is, to reduce one part.

One embodiment of the present disclosure provides a backlight lamp cover, which comprises a supporting plate located at a light emitting surface side of a light guide plate for supporting a liquid crystal display panel. Said supporting plate is provided at one edge thereof with a bending structure, and said bending structure comprises a first turning portion for limiting a movement of the liquid crystal display panel on said supporting plate and a second turning portion for supporting a bezel.

A second embodiment of the present disclosure provides a backlight backboard for accommodating a light guide plate, of which the side portion corresponding to a light incident surface of the light guide plate is used to accommodate a backlight lamp cover, and side portions not for accommodating the backlight lamp cover are provided at a top end thereof with a stepped structure. Said stepped structure comprises a supporting portion for supporting a liquid crystal display panel and a stopper portion for limiting a movement of the liquid crystal display panel on said supporting portion.

A third embodiment of the present disclosure provides a liquid crystal display module, which comprises a light guide plate, a liquid crystal display panel and a bezel, and further comprises:

a backlight lamp cover, which comprises a supporting plate located at a light emitting surface side of the light guide plate for supporting the liquid crystal display panel, said supporting plate being provided at one edge thereof with a bending structure, and said bending structure comprising a first turning portion for limiting a movement of the liquid crystal display panel on said supporting plate and a second turning portion for supporting the bezel; and a backlight backboard, of which a side portion corresponding to the light incident surface of the light guide plate is used for accommodating a backlight lamp cover, and side portions not for accommodating the backlight lamp cover are provided at the top end thereof with a stepped structure, said stepped structure comprising a supporting portion for supporting the liquid crystal display panel and a stopper portion for limiting a movement of the liquid crystal display panel on said supporting portion.

Embodiments of the present disclosure provide a backlight lamp cover, a backlight backboard and a liquid crystal display module. According to embodiments of the present disclosure, the structure of the lamp cover is improved in that besides the functions of protecting a lamp tube and dissipating heat from the lamp tube, the backlight lamp cover is further provided with a bending structure to support and limit a movement of the liquid crystal display panel as well as to support a bezel, so that the lamp cover provides main functions of a mold frame in the related art in substitution of the latter. In consideration of that the backlight lamp cover is only accommodated in the backlight backboard at the side portion corresponding to the light incident surface of the light guide plate, and side portions of the backlight backboard not for accommodating the backlight lamp cover do not completely limit the movement of the liquid crystal display panel, after the structure of the backlight lamp cover is modified, the structure of the backboard is correspondingly improved by providing a stepped structure thereto, so as to supplementally limit the liquid crystal display panel. As a result, with embodiments of the present disclosure, it is possible to provide all the functions of a mold frame in the liquid crystal display module with the mold frame canceled, so that the assembly procedure is simplified, the development cost for the mold frame is saved, leading to a greatly reduced cost and an improved competitiveness of products. In addition, as the mold frame is canceled and the lamp cover is used instead to direct support and limit movements of the liquid crystal display panel, the entire thickness of the liquid crystal display module is reduced, which is also advantageous for making the entire liquid crystal display apparatus slim and light.

DETAILED DESCRIPTION OF THE PREFERRED EMBODIMENTS

The technical solutions of the embodiments of the present disclosure will be described hereinafter in detail in conjunction with the accompanying drawings for the embodiments of the present disclosure.

The First Embodiment

Figure 1:
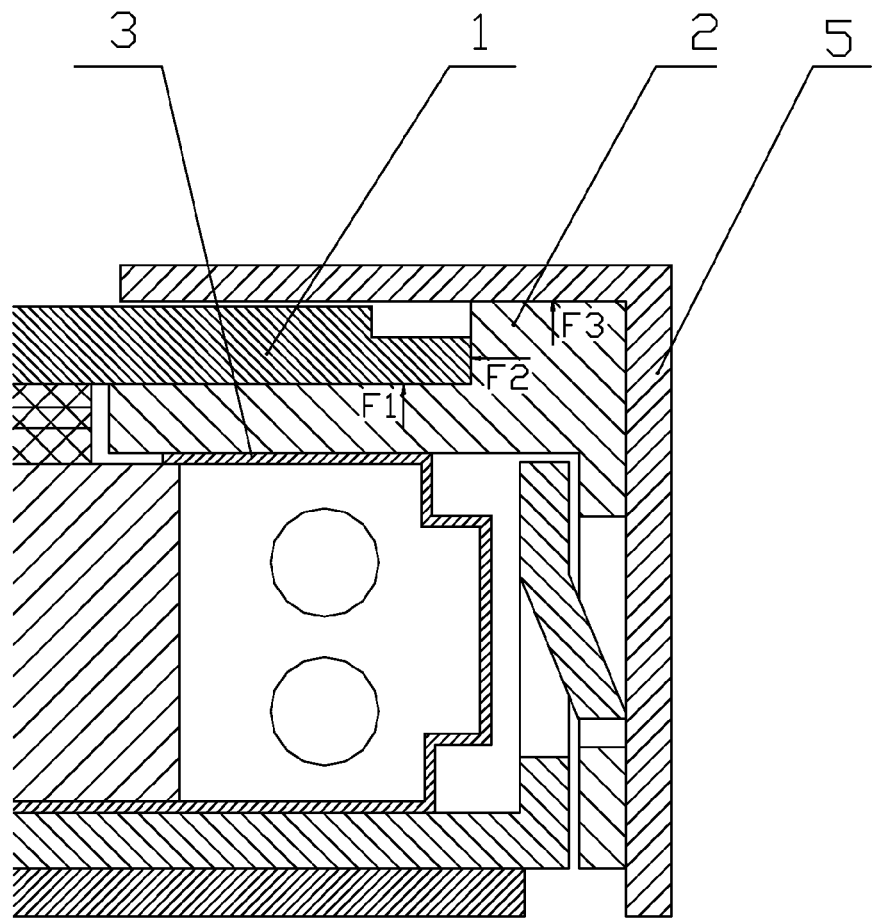
FIG. 1 is a schematic partial-sectional view showing a liquid crystal display module in the related art.
Figure 2:
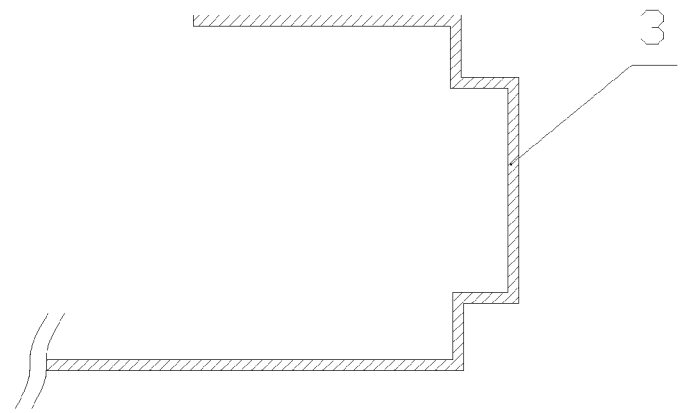
FIG. 2 is a schematic partial-sectional view showing a backlight lamp cover in the related art.
Figure 3:
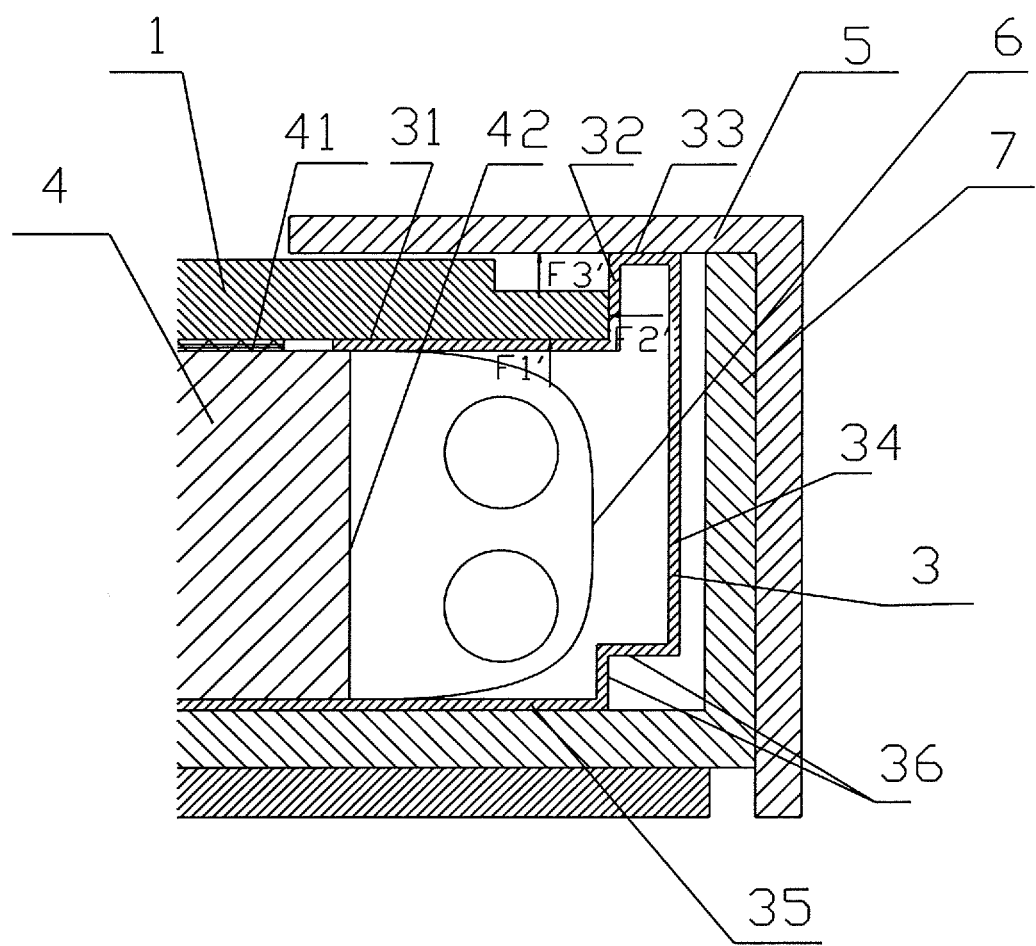
FIG. 3 is a schematic partial-sectional view showing a side of a liquid crystal display module that accommodates a backlight lamp cover in accordance with an embodiment of the present disclosure.
Figure 4:
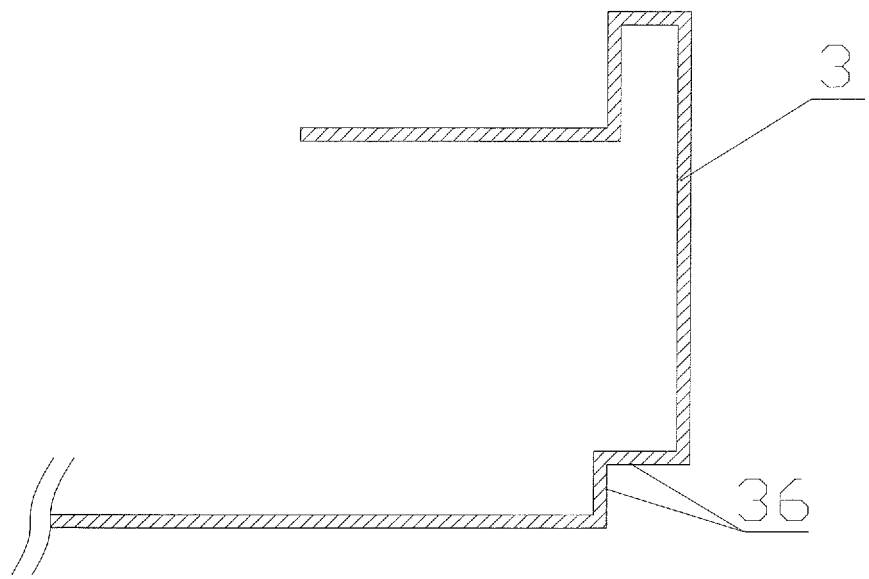
FIG. 4 is a schematic partial-sectional view showing a backlight lamp cover in accordance with an embodiment of the present disclosure.

This embodiment provides a backlight lamp cover. As shown in FIG. 3 and FIG. 4, besides the functions of protecting a lamp tube and dissipating heat from the lamp tube, the backlight lamp cover 3 further comprises a supporting plate 31, which is mounted at a light emitting surface side of a light guide plate 4 and directly supports a liquid crystal panel 1, with the supporting force for supporting the liquid crystal panel illustrated as F1' in FIG. 3. Moreover, a bending structure is added on an edge of the supporting plate 31. A first turning portion 32 of the bending structure is bent upward in FIG. 3 so as to limit a movement of the liquid crystal panel 2 on the supporting plate 31 by means of the first turning portion 32. The acting force of the first turning portion 32 for limiting the movement of the liquid crystal panel 1 is illustrated as F2' in FIG. 3. The bending structure also comprises a second turning portion 33 which is bent towards a horizontal direction in FIG. 3 and directly supports the bezel 5. The acting force for supporting the bezel 5 is illustrated as F3' in FIG. 3. F1', F2', F3' in FIG. 3 corresponds to F1, F2, F3 in FIG. 1, respectively, and thus the lamp cover 3 in FIG. 3 provides the movement-limiting function in substitution of the conventional mold frame 2 in FIG. 1. Therefore, after the improvement of the structure of the lamp cover, besides the functions of protecting a lamp tube and dissipating the lamp tube, the backlight lamp cover provides a bending structure to support and limit the liquid crystal panel as well as support the bezel, and thus provides main functions of the conventional mold frame in the related art in substation of the latter.

As shown in FIG. 3, a first protective plate 34 and a second protective plate 35 extend from said second turning portion 33 and are joined in sequence, with said first protective plate 34 being opposed to the light incident surface 42 of the light guide plate 4, and said second protective plate 35 being mounted on an opposing side to the light emitting surface 41 of the light guide plate 4. With the use of the first protective plate 34 and the second protective plate 35, it is possible to place the entire lamp cover 3 securely in a backlight module.

Figure 5:
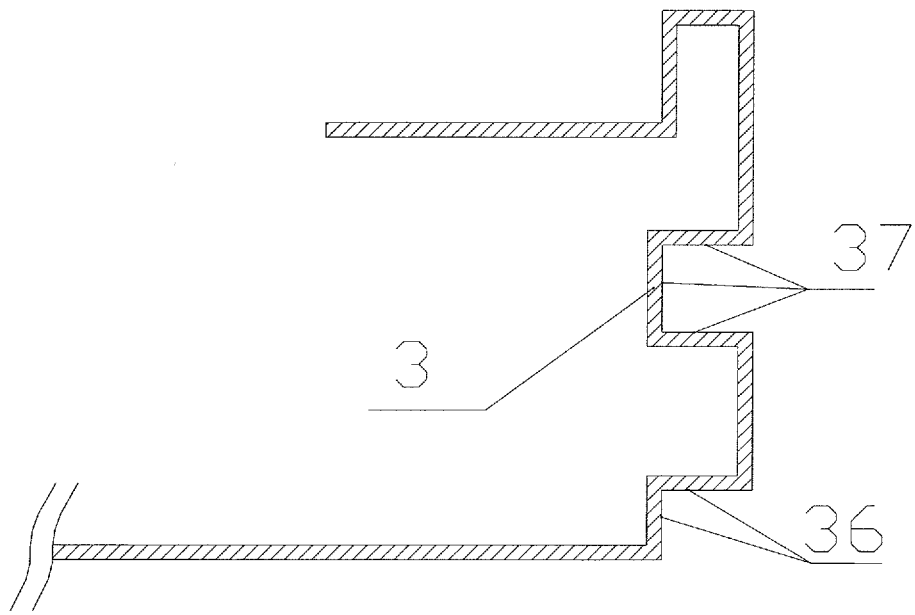
FIG. 5 is a schematic partial-sectional view showing a backlight lamp cover being further provided with a wiring recess in accordance with an embodiment of the present disclosure.

As shown in FIG. 3 and FIG. 4, said first protective plate 34 is provided thereon with at least one recess 36 concaved toward said light incident surface. The embodiment of the present disclosure is not limited to a specific position for the recess. In addition to the position provided for the recess shown in FIG. 4, the recess can also be provided in a way as shown in FIG. 5. That is, a recess 37 is further provided on the first protective plate 34. The recess 36 and the recess 37 in the present embodiment can both be used for wiring.

Figure 6:
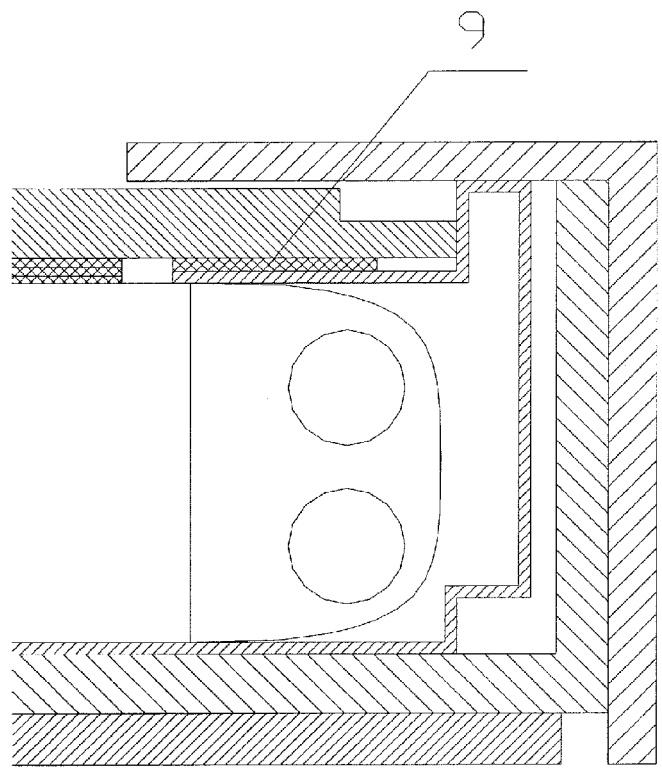
FIG. 6 is a schematic partial-sectional view showing a liquid crystal display module being further provided with a pad in accordance with an embodiment of the present disclosure.

As shown in FIG. 6, in order to adjust an appropriate distance between the liquid crystal display panel and the backlight, a pad 9 (such as a Silica gel sheet) having a suitable thickness may be affixed onto the lamp cover for proper adjustment. Also, the pad 9 also functions as a buffer. While the pad 9 occupies certain thickness, insofar as a whole is concerned, the cancellation of the mold frame causes the entire thickness of the liquid crystal display module decreased, which is advantageous for making the entire liquid crystal display module slim and light.

A reflection sheet can be affixed to the backlight lamp cover on a surface facing the light incident surface of the light guide plate. Alternatively, as shown in FIG. 3, a reflection sheet 6 bends around the light source at a side facing the light incident surface of the light guide plate and between the light guide plate 4 and the lamp cover 3, so as to form a closed illumination zone to make better use of the light source in the lamp cover 3.

The Second Embodiment

Figure 7:
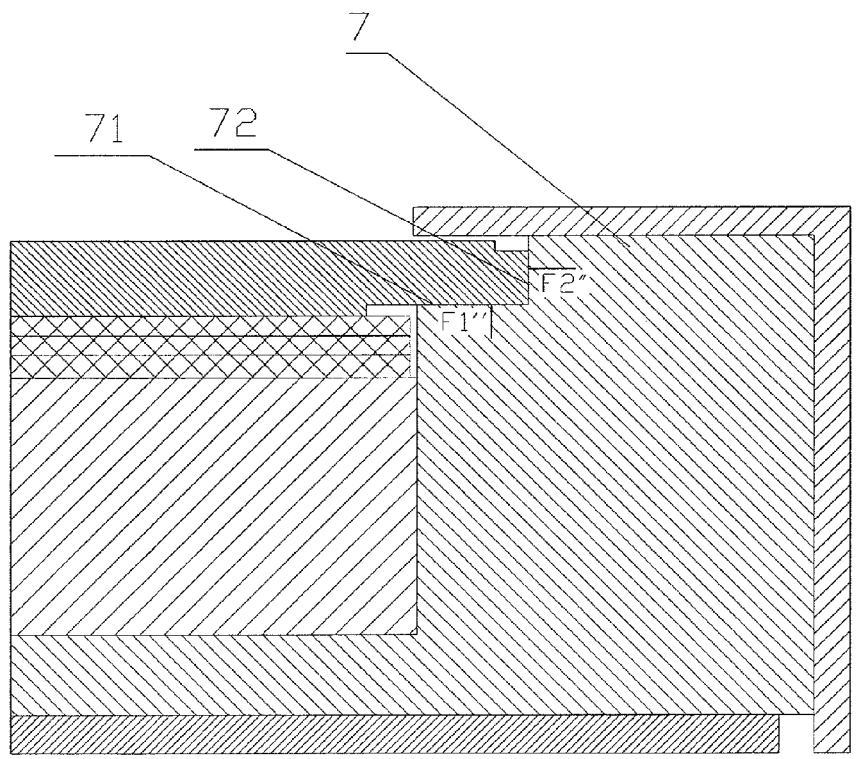
FIG. 7 is a schematic partial-sectional view showing a side of a liquid crystal display module that does not accommodate a backlight lamp cover in accordance with an embodiment of the present disclosure.

The present embodiment provides a backlight backboard. As shown in FIG. 3 and FIG. 7, the backboard 7 is used for mounting a backlight lamp cover 3. However, the backlight lamp cover 3 is only accommodated at the side portion of the backlight backboard 7 corresponding to the light incident surface of the light guide plate 4, whereas the side portions of the backlight backboard 7 not accommodating the backlight lamp cover 3 do not completely limit the position of the liquid crystal display panel 1 In consideration of the above situation, the structure of the backlight backboard 7 is also improved correspondingly, so that the backlight backboard 7 comprises a stepped structure located at the top end of a side portion thereof not accommodating the backlight lamp cover 3. The stepped structure comprises a supporting portion 71 for supporting the liquid crystal display panel 1 and a stopper portion 72 for limiting a movement of the liquid crystal display panel 1 on the supporting portion 72. The supporting portion 71 directly supports the liquid crystal display panel 1, the acting force for supporting the liquid crystal display panel 1 being illustrated as F1', and the stopper portion 72 limits a movement of the liquid crystal display panel 1 on the supporting portion 7, the acting force for preventing the liquid crystal display panel 1 from moving being illustrated as F2'. Thus, F1' and F2' in FIG. 3 corresponds to F1 and F2 in FIG. 1, respectively, and thus the backlight backboard 7 provides a part of the movement-limiting function of the former mold frame 2 in FIG. 1 in substitution of the latter. In this way, the backlight lamp cover 3 and the backlight backboard 7 fully substitute the mold frame 2 in FIG. 1, which cancels the mold frame as a main part of the liquid crystal display module, simplifies the assembly procedure, and at the same time saves the development cost for dies for the mold frame, saving the costs greatly and improving a product's competitiveness.

In addition, a wiring groove for a light source can be provided at the outer side of the side portion of the backlight backboard adjacent to the backlight lamp cover, with one end of the wiring groove for a lamp tube extending to the backlight lamp cover and the other end extending to the back side of the backlight backboard. In this way, the wiring conventionally employed in the related art on the mold frame is replaced.

Similarly to the pad in FIG. 6, a pad may be affixed to the backlight lamp cover on the surface of the supporting portion thereof supporting the liquid crystal display panel, so that an appropriate distance between the liquid crystal display panel and the backlight can be adjusted by affixing a pad of a suitable thickness. Also, the pad can function as a buffer.

The Third Embodiment

The present embodiment provides a liquid crystal display module, which, as shown in FIG. 3 and FIG. 7, comprises a light guide plate 4, a liquid crystal display panel 1 and a bezel 5. The module further comprises: a backlight lamp cover 3, which comprises a supporting plate 31 located at a light emitting surface side of a light guide plate for supporting the liquid crystal display panel 1 and having at an edge thereof a bending structure that comprises a first turning portion 32 for limiting a movement of the liquid crystal display panel on the supporting plate 31 and a second turning portion 33 for supporting the bezel 5; and a backlight backboard 7, of which the side portion corresponding to the light incident surface of the light guide plate 4 is used for accommodating the backlight lamp cover 3, and the side portions not accommodating the backlight lamp cover 3 are provided at the top end thereof with a stepped structure that comprises a supporting portion 71 for supporting the liquid crystal display panel 1 and a stopper portion 72 for limiting a movement of the liquid crystal display panel on said supporting portion. Thus, the backlight lamp cover 3 and the backlight 7 provide all the functions of the former mold frame in substitution of the latter, and thus a mold frame as a main part in the liquid crystal display module is canceled, the assembly procedure is simplified, and at the same time the development cost for the mold frame is saved, leading to a greatly reduced cost and a improved competitiveness of products. Moreover, with the cancellation of the mold frame and the use of the lamp cover to directly support and limit the movement of the liquid crystal display panel, the entire thickness of the liquid crystal display module is decreased, which is also advantageous for making the entire liquid crystal display apparatus slim and light.

In the related art, the liquid crystal display module, the backlight backboard, and the bezel are engaged with the mold frame respectively. However, with embodiments of the present disclosure, due to the cancellation of the mold frame, the backlight backboard 7 and said bezel 3 can directly engage with each other.

The backlight lamp cover in this embodiment of the present disclosure may be configured as described in the First Embodiment, and the backlight backboard may be configured as described in the Second Embodiment.

The technical solutions provided by the embodiments of the present disclosure can be applied to devices such as liquid crystal computers, liquid crystal televisions, cell phones, PDA and the like.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A backlight lamp cover, being of a plate member and shaped by bending the plate member configured to contain a light guide plate and support a liquid crystal panel, comprising:
a supporting plate located at a light emitting surface side of the light guide plate for supporting the liquid crystal panel;
a bending structure provided at one edge of the supporting plate, said bending structure comprising a first turning portion for limiting a movement of the liquid crystal panel on said supporting plate and a second turning portion for supporting a bezel; and
a first protective plate and a second protective plate extending from the second turning portion and joined in sequence, the first protective plate being arranged opposed to a light incident surface of the light guide plate, the first protective plate and the first turning portion being provided on two sides of the second turning portion to form a projection portion which is projected from the supporting plate and has an internal space, and the second protective plate being mounted on the side opposed to a light emitting surface of the light guide plate and parallel to the supporting structure.

2. The backlight lamp cover according to claim 1, wherein the first protective plate is parallel to the light incident surface of the light guide plate, and a height of the first protective plate, from the second protective plate to the second turning portion, more than a sum of heights of the light guide plate and the liquid crystal panel.

3. The backlight lamp cover according to claim 2, wherein said first protective plate is provided with at least one recess concaved towards said light incident surface for wiring.

4. The backlight lamp cover according to claim 1, wherein said supporting plate is provided with a pad on a surface thereof supporting the liquid crystal panel.

5. The backlight lamp cover according to claim 2, wherein said supporting plate is provided with a pad on a surface thereof supporting the liquid crystal panel.

6. The backlight lamp cover according to claim 3, wherein said supporting plate is provided with a pad on a surface thereof supporting the liquid crystal panel.

7. The backlight lamp cover according to claim 1, wherein a reflection sheet bending around a light source is provided at a side of said backlight lamp cover facing the light incident surface of the light guide plate; or a reflection sheet is affixed to a side of said backlight lamp cover facing the light incident surface of the light guide plate.

8. The backlight lamp cover according to claim 2, wherein a reflection sheet bending around a light source is provided at a side of said backlight lamp cover facing the light incident surface of the light guide plate; or a reflection sheet is affixed to a side of said backlight lamp cover facing the light incident surface of the light guide plate.

9. The backlight lamp cover according to claim 3, wherein a reflection sheet bending around a light source is provided at a side of said backlight lamp cover facing the light incident surface of the light guide plate; or a reflection sheet is affixed to a side of said backlight lamp cover facing the light incident surface of the light guide plate.

10. A liquid crystal module, comprising a light guide plate, a liquid crystal panel and a bezel, wherein the liquid crystal module further comprises:
a backlight lamp cover, which is of a plate member and shaped by bending the plate member configured to contain the light guide plate and support the liquid crystal panel and comprises:

a supporting plate located at a light emitting surface side of the light guide plate for supporting the liquid crystal panel;

a bending structure provided at one edge of the supporting plate, the bending structure comprising a first turning portion for limiting a movement of the liquid crystal panel on the supporting plate and a second turning portion for supporting a bezel; and a first protective plate and a second protective plate extending from the second turning portion and joined in sequence, the first protective plate being arranged opposed to a light incident surface of the light guide plate, the first protective plate and the first turning portion being provided on two sides of the second turning portion to form a projection portion which is projected from the supporting plate and has an internal space, and the second protective plate being mounted on the side opposed to a light emitting surface of the light guide plate and parallel to the supporting structure; and a backlight backboard, of which a side portion corresponding to the light incident surface of the light guide plate is used for accommodating a backlight lamp cover, and side portions not for accommodating the backlight lamp cover are provided at the top end thereof with a stepped structure, said stepped structure comprising a supporting portion for supporting the liquid crystal panel and a stopper portion for limiting a movement of the liquid crystal panel on said supporting portion, wherein the backlight lamp cover is provided inside the backlight backboard and the bezel.

11. The liquid crystal module according to claim 10, wherein said backlight backboard and said bezel engage directly with each other.

12. The liquid crystal module according to claim 10, wherein said supporting plate is provided with a pad on a surface thereof supporting the liquid crystal panel.

13. The liquid crystal module according to claim 10, wherein said supporting portion is provided with a pad on a surface thereof supporting the liquid crystal panel.

14. The liquid crystal module according to claim 10, wherein the first protective plate is parallel to the light incident surface of the light guide plate, and a height of the first protective plate, from the second protective plate to the second turning portion, more than a sum of heights of the light guide plate and the liquid crystal panel.

* * * * *